United States Patent [19]

Forestieri et al.

[11] Patent Number: 5,357,580
[45] Date of Patent: Oct. 18, 1994

[54] TEMPORAL FILTERING OF COLOR DOPPLER SIGNAL DATA

[75] Inventors: Steven F. Forestieri, Santa Clara; Ray S. Spratt, San Jose, both of Calif.

[73] Assignee: Diasonics Ultrasound, Inc., Milpitas, Calif.

[21] Appl. No.: 845,218

[22] Filed: Mar. 3, 1992

[51] Int. Cl.⁵ .............................................. G06K 9/44
[52] U.S. Cl. .......................................... 382/6; 382/54; 364/413.25; 364/724.19
[58] Field of Search ........... 382/6, 54, 724.01, 724.17, 382/724.19, 413.25, 413.19; 128/660.01, 660.07, 662.02; 73/602

[56] References Cited

U.S. PATENT DOCUMENTS

| | | | |
|---|---|---|---|
| 3,889,108 | 6/1975 | Cantrell | 364/724.19 |
| 4,038,536 | 7/1977 | Feintuch | 364/724.19 |
| 4,305,133 | 12/1981 | Amada et al. | 364/724.17 |
| 4,785,818 | 11/1988 | Hardin | 358/112 |
| 4,887,306 | 12/1989 | Hwang et al. | 382/54 |
| 5,060,515 | 10/1991 | Kanda et al. | 382/6 |
| 5,152,292 | 10/1992 | Karp | 128/660.07 |

*Primary Examiner*—Stephen Chin
*Assistant Examiner*—Timothy J. May

*Attorney, Agent, or Firm*—Blakely, Sokoloff, Taylor & Zafman

[57] ABSTRACT

An apparatus for temporal filtering in an ultrasonic imaging system. The apparatus has a means for storing previous imaging information from a previous time period and a means for storing current imaging information from a current time period. Means for determining the larger of the current and previous imaging information is provided and a means is provided for generating an alpha value responsive to the larger information. The alpha value ranges between a minimum and maximum values and has the maximum value when the larger information has a large frequency and has the minimum value when the larger information has a small frequency. Means for generating output imaging information is provided, the output imaging information generated by multiplying the current imaging information by alpha and summing it with the product of the maximum value minus alpha and the previous imaging information. The apparatus provides a means for heavily averaging the imaging information for small frequencies of the larger information and maintaining the pulsatility of large frequencies for fast moving blood velocities. In the preferred embodiment, errors and noise are minimized at frequencies near the baseline, and frequencies near Nyquist are not averaged at all. In one embodiment the apparatus comprises a lookup table.

13 Claims, 9 Drawing Sheets

TEMPORAL FILTERING OF COLOR DOPPLER SIGNAL DATA

BACKGROUND OF THE INVENTION

1. Field of the Invention

The present invention relates to ultrasonic imaging apparatus. More specifically, this invention relates to a temporal filter used for maintaining the pulsatility of displayed blood flow information while increasing the signal-to-noise ratio for low velocities of the blood flow.

2. Background of Related Art

Images of living organisms typically utilize methods that pass various types of radiation through the body of the subject and measure the output with a suitable detector. For instance, x-ray images are generated by producing x-rays external to the body, passing the x-radiation through the body and observing shadows produced on x-ray sensitive film. Ultrasonic images, in contrast, are formed by producing ultrasonic waves using a transducer, passing those waves through the subject's body, and measuring the properties of the scattered echoes from reflections inside the body using a receptor. This is done by applying the well-known Doppler effect, by measuring the phase shifts of the reflected waves from the waves passed through the subject's body. An ultrasonic imaging apparatus may be distinguished from other medical imaging apparatus in that they allow the display of soft tissues within the body which show various structural details such as organs and blood flow.

The basic principle used in applying the Doppler effect for imaging in a pulsed Doppler ultrasound imaging apparatus is described as follows. When blood flow within a living subject is subjected to ultrasonic waves, corpuscles are caused to vibrate slightly while moving and reflect those ultrasonic waves. Because of the corpuscle velocity, the frequency of the reflected waves changes from that of the transmitted waves due to the Doppler effect. The frequency shift may be detected and the amount of the shift may be used to display velocity information of blood flow on a video screen for imaging the living subject. Because the amount of phase shift of the reflected waves from the transmitted waves is proportional to the blood flow velocity, the amount and speed of the blood flow may be determined. Noise and other signals (clutter) which have Doppler shift but don't represent blood movement in the subject are filtered out, so that the image produced only represents blood flow. In color Doppler imaging the frequency information is then used as blood flow information for forming a two-dimensional image or profile of the blood flow velocity.

One such apparatus used in displaying information obtained from ultrasonic reference pulses transmitted into a living subject is shown in FIG. 1 as imaging system 100. Imaging system 100 generally comprises a probe 101 which is coupled via line 110 to transmitter/receiver circuitry 102. Transmitter/receiver circuitry 102 is designed so that the elements in probe 10 1 (or the single element in a motorized probe) will be fired at specific time intervals to simulate an elliptical surface and focus on a particular point in the body. Reflected signals are detected using a receiver in probe 101 at a second time interval. Transmitter/receiver circuitry 102 is coupled to a control unit 109 via bus 120. Control unit 109 controls circuitry in the imaging system via bus 120 such as timing of the reference pulse and operation of the receiver in probe 101. Control unit 109 is further coupled to a keyboard 125 and a mouse, trackball or other device 126 for movement and control of information shown on video display 130.

Once a pulse is received by the receiver circuitry within transmitter/receiver 102, such information is transmitted by line 111 to RF (radio frequency) processor 103 for further processing. RF processor 103 processes the RF information to produce an envelope signal and in-phase (I) and quadrature (Q) Doppler signals. This information is further transmitted via line 114 to a scan converter 105 and to a Doppler processor 106 via lines 114 and 113 for generation of black and white ultrasound information on video display 130. Information generated by Doppler processor 106 via I and Q signals output from RF processor 103 are transmitted via line 115 to scan converter 105. Scan converter 105 then integrates information received from RF processor 103 and Doppler processor 106 and transmits scan line information to video processor 127 via line 116. In addition to information passed to scan converter 105 and Doppler processor 106, RF processor 103 transmits I and Q signals via line 112 to color flow processor 104. Color flow processor 104 is also controlled by control unit 109 via bus 120. Color flow processor 104 is used for detecting Doppler shift and blood flow information in living tissue, and thus transmits such information via line 117 to a color scan converter 108. Such color information is used to graphically represent moving blood flow in the living organism on video display 130. Color scan converter 108 is used to interpolate scan line information obtained from color flow processor 104, and transmit that information on line 118 and thus to video processor 127 for representation of blood flow in the human body. Video processor 127 then utilizes information obtained from scan converter 105 for display of black and white ultrasound information and color information obtained from color scan converter 108 to generate a color image showing blood flow in color overlaid on a black and white image showing stationary tissue suitable for output on a video display such as 130 via line 119. Such information may be transmitted in National Television Standards Committee (NTSC) format and thus be stored on video tape for later clinical examination by attending medical personnel.

One inherent problem of displaying blood flow within an organism is that when there is little phase shift from the pulse repetition frequency (PRF), (thus indicating stationary or very slow moving blood flow), there tends to be inaccurate and/or confusing representations of the blood flow. As measurements show stationary or slow moving blood flow, the actual flow may be shown in such a way as to confuse the clinician. This is graphically represented with reference to FIG. 2. As is shown in the velocity versus time graph 200 on FIG. 2, a particular blood flow may be at or near the base line 203 of the graph thus indicating very slow moving or stationary blood flow movement. Blood flow which is either stationary or moving very slowly in a particular direction may result in measurement inaccuracies by the ultrasonic imaging apparatus thereby causing blood flow to appear to be moving when it is stationary, or moving in an opposite direction than it is actually moving. This causes artifacts or a variety of colors on a display such as 130 shown in FIG. 1. In addition, because stationary or very slow moving blood flow may be moving very slightly, small areas in the flow appear to be flowing towards the transducer or away from the transducer. In a two-color display showing blood movement in one direction as red (red-shifted) or blue (blue shifted), this may be very confusing to an operator or attending clinical personnel. In other words, the display in the stationary or slow moving area may appear as a series of blue and red pixels interspersed. This may mask actual problems that the subject is experiencing or show problems where none exist.

One prior art method to limit the amount of distortion which occurs on display 130 due to little or no blood movement, is the use of a temporal filter. Once such temporal filter which may be present in a video processor such as 127 shown in FIG. 1 is shown as 300 in FIG. 3. In this prior art system, input and output lines comprise 8 bits of color information for 256 possible color levels which may be displayed for each pixel on a screen such as 130 shown in FIG. 1. 300 has two signal paths 310 and 320 holding the new color data for a pixel to be displayed on video display 130, and old pixel data contained on line 320 which holds a previous time period's pixel information. These two signal lines are input to two multipliers 301 and 302 which generate the product of input data obtained from lines 310 and 320, and data contained on lines 311 and 321. Multiplier 301, in addition to receiving new data 310, receives an alpha value ($\alpha$) over line 311. In this example, $\alpha$ varies between 0 and 1. Multiplier 301 generates the product of $\alpha$ received over line 311 and the new data received over line 310. Multiplier 301 generates the product of the multiplication on line 312. Multiplier 302 accepts old pixel data over line 320 and a value received over line 321 which contains $1-\alpha$. The old data on line 320 is obtained from the previous output of circuit 300 on line 330 which is fed back through delay circuit 305. Delay circuit 305 delays the original information from a previous frame so that it can arrive at multiplier 302 at the same time as the new frame data over line 310 arrives at multiplier 301. A product is generated by multiplier 302 over lines 322. Lines 312 and 322 are input to an 8-bit adder circuit 303. Then, the resulting 8-bit sum generated by adder 303 is output over lines 330, and ready for display on video display 130 as shown in FIG. 1. This information may also be input to a delay circuit 305 in order to generate the old pixel value for the new frame at lines 320. In short, the circuit shown as 300 in FIG. 3 is defined by the following equation:

$$\text{output pixel} = \alpha \cdot \text{data}_{new} + (1-\alpha)\text{data}_{old}$$

The output value is therefore a temporal weighting of an old pixel's value and a new pixel's value. This provides a smooth transition between the old data residing at that position and the new data. A temporal filter having a fixed value of $\alpha$ as shown in FIG. 3 also has some undesired effects.

FIG. 4 shows the results of applying a temporal filter with a fixed value of $\alpha$ applied across the color signal range as was shown in FIG. 2. As is shown in waveform 400 in FIG. 4, although region 401 (corresponding with region 201 in FIG. 2) has been substantially smoothed, the peaks such as 202 in FIG. 2 have also been smoothed as shown by 402. In other words, because an average between the previous signal and the current signal has been perforated, large variances in the signal have been eliminated. Although the distortions which previously occurred in region 201 have been eliminated, serious distortions have been caused in area 402 of curve 400 of large variances in the original signal such as in region 202. In other words, the pulsatility in a region such as 202 in FIG. 2 (which may be caused in an artery due to the pumping action of the heart) has been comprised. Again, this major distortion may add to confusion and/or misdiagnosis by clinical personnel because high velocity data at a discrete interval in time is averaged heavily and does not reach its actual maximum value on the display. Another problem occurs due to the averaging of a previous signal and a current signal, in that unacceptably long decay times for colors on display 130 may occur. For instance, very long delay times may result in data being displayed even after the probe is no longer receiving information. In summary, applying a fixed value of $\alpha$ to perform temporal filtering of blood flow imagery has several undesirable effects.

SUMMARY AND OBJECTS OF THE INVENTION

One of the objects of the present invention is to reduce noise in an ultrasonic imaging system when encountering little or no blood flow, while preserving the pulsatile portion of the blood flow for display.

Another of the objects of the present invention is to retain the advantages of temporal filtering of blood flow signal data for display in an ultrasonic imaging system, while eliminating the distortions caused by fixed values of alpha applied to high pulsatility signal data.

These and other objects are provided for by an apparatus for temporal filtering in an ultrasonic imaging system which comprises a means for storing previous imaging information from a previous time period and a means for storing current imaging information from a current time period. The apparatus comprises a means for determining the larger of the current and previous imaging information. The apparatus further comprises a means for generating an alpha value responsive to the larger information. The alpha value ranges between a minimum and maximum values and has the maximum value when the larger information has a large frequency and has the minimum value when the larger information has a small frequency. The apparatus further comprises a means for generating output imaging information, the output imaging information generated by multiplying the current imaging information by alpha and summing it with the product of the maximum value minus alpha and the previous imaging information. In a preferred embodiment, the apparatus provides a means for heavily averaging the imaging information for small frequencies of the larger information and maintaining the pulsatility of large frequencies for fast moving blood velocities. In this manner of the preferred embodiment, errors and noise are minimized at frequencies near the baseline, and frequencies near Nyquist are not averaged at all. In a preferred embodiment the apparatus comprises a lookup table. The lookup table implements this variable alpha temporal filtering.

These and other objects are provided for by a method of temporal filtering in an ultrasonic imaging system which comprises storing previous imaging information from a previous time period and storing current imaging information from a current time period. The method comprises determining the larger of the current and the previous imaging information. The larger information is used to generate an alpha value, the alpha value ranging between a minimum and maximum values. The alpha value has the maximum value when the larger information has a large frequency and has the minimum value when the larger information has a small frequency. The method further comprises generating output imaging information by multiplying the current imaging information by alpha and summing it with the product of the maximum value minus alpha and the previous imaging information.

These and other objects are provided for by an apparatus for temporal filtering in an ultrasonic imaging system which comprises a means for storing previous imaging information from a previous time period and a means for storing current imaging information from a current time period. The apparatus further comprises a means for applying the previous imaging information and the current imaging information to a lookup table. The lookup table generates output imaging information responsive to the previous imaging information and the current imaging information, and the output imaging information has a magnitude equal to the sum of the product of the current imaging information and an alpha value and the product of a difference of a maximum value and the alpha value and the previous imaging information. The alpha value ranges between zero for small frequencies of the larger of the current and previous imaging information and the maximum value for large frequencies of the larger information. In a preferred embodiment, the minimum value is zero and the maximum value is one.

BRIEF DESCRIPTION OF THE DRAWINGS

The present invention is illustrated by way of example and not limitation of the figures of the accompanying in which like references indicate like elements and in which.

DETAILED DESCRIPTION

An apparatus and method for temporal filtering of ultrasonic image data using frequency dependent alpha values is described. In the following description, for the purposes of explanation, numerous specific details are set forth such as circuitry, signal names, and times in order to provide a thorough understanding of the present invention. It will be obvious, however, to one skilled in the art that the invention may be practiced without these specific details. In other instances, well-known circuits, structures, formats, and signals have not been shown in detail in order to not unnecessarily obscure the present invention.

Figure 4:
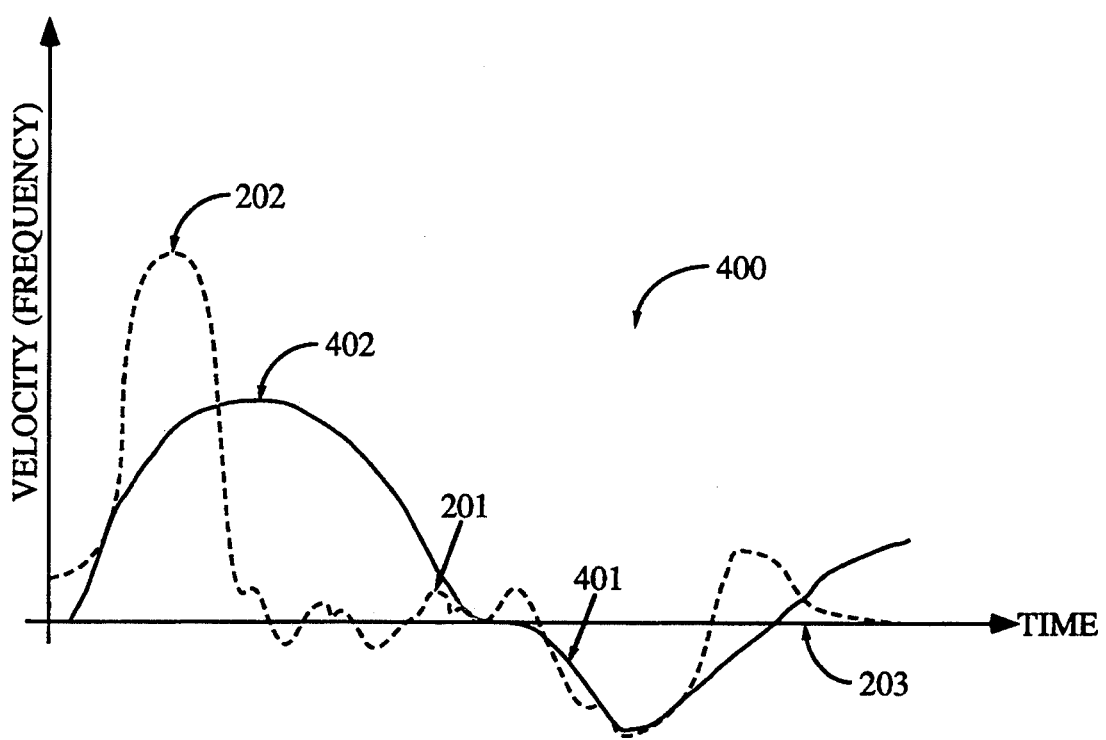
FIG. 4 shows the waveform which results from using a fixed $\alpha$ value in a prior art temporal filter of FIG. 3.

The preferred embodiment provides a means for performing temporal filtering upon ultrasonic imagery data such that: the alpha value ($\alpha$) for the temporal filtering varies between a minimum value when the frequency data is small, and a maximum value when the frequency data is large. The value of $\alpha$ ranges between this minimum and maximum value, wherein, in one embodiment, the minimum value is 0 and the maximum value is 1. This allows the old Doppler data and the new Doppler data to be combined to generate output pixel data by varying the amount that each contributes to the output pixel. As was discussed with reference to the waveforms shown in FIGS. 2 and 4 above, a means is provided which maintains the pulsatility of the data when there are large frequency variations, and smooths out frequency data at or near the base line which indicates slow moving or stationary blood flow. Therefore, noise and misleading information to a viewer of the ultrasound imaging apparatus is minimized at the lower frequency shifts (velocities), when blood flow is moving slowly or is stationary. Also, pulsatility of the signal is preserved when large frequency changes are observed due to the large changes in velocity of the blood. This therefore provides a means for observing reasonably accurately while minimizing noise and distortions, the blood flow in vessels such as arteries and veins which results from the pumping action of the living subject's heart. The preferred embodiment therefore provides a means for heavily averaging low velocity blood flows, and performing little or no averaging on high velocity blood flows, thus maintaining a display of the blood flow's pulsatility.

Assuming that the error associated with the estimate of Doppler shift frequency caused by reflecting a pulse reference wave against blood flow in living tissue is independent of frequency, then the signal-to-noise ratio will be small when the frequency is small. In contrast, the signal-to-noise ratio of high frequency pulsatile parts of blood flow will be high. Temporal filtering allows signal data to be averaged or smoothed over a time interval T. The improvement in the signal-to-noise ratio (S/N) will be proportional to the square root of T. Therefore, in order to maintain the same signal-to-noise ratio at lower frequencies as at higher frequencies, longer filters (greater values of T) should be used for filtering at the lower frequencies than for high frequency portions of the blood flow cycle.

For example, if the RMS noise level of a signal is N, and the Doppler frequency is F, then the signal-to-noise ratio (S/N) is:

$$S/N = \frac{F}{N}$$

If the frequency-dependent length of the smoothing filter is T, then the signal-to-noise ratio S/N has the following relationship with the frequency F, and the noise N:

$$S/N \propto \sqrt{T} \, \frac{F}{N}$$

To maintain the same signal-to-noise ratio for all frequencies F, then the filter length T should vary thus:

$$T \propto \left((S/N)\frac{N}{F}\right)^2$$

In this way, as the frequency F of the reflected wave increases, the value of the filter length T becomes increasingly small.

A single lag feedback filter, as set forth in the prior art discussion above, uses a portion of the new data and a portion of the old data in order to generate an output value like so:

output pixel = $\alpha \cdot$ data$_{new}$ + $(1-\alpha)$data$_{old}$ where $\alpha$ is a value ranging between 0 and 1. Applying the value of T to compute the value of $\alpha$, T has the following relationship to $\alpha$:

$$T \propto 1 + (1-\alpha) + (1-\alpha)^2 + \ldots = \frac{1}{\alpha}$$

In sum, because the value of T is proportional to $1/\alpha$, the value of $\alpha$ can be expressed in terms of the frequency F, noise N, and signal-to-noise ratio S/N by substituting as follows:

$$\alpha \propto \left(\frac{F}{N(S/N)}\right)^2$$

Figure 5:
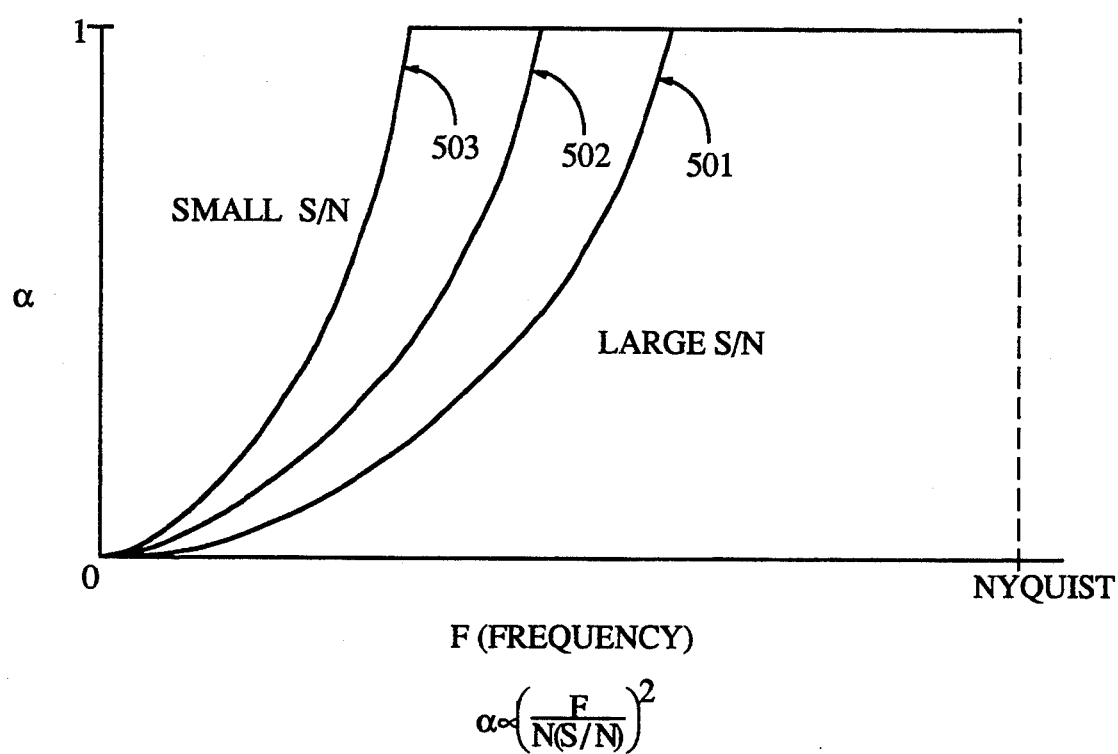
FIG. 5 shows example curves to generate different values of $\alpha$ which are dependent upon frequency.

The preferred embodiment establishes a means for providing a variety of signal-to-noise ratios and values of $\alpha$ for filtering. These various filter levels are shown with reference to FIG. 5. As shown in FIG. 5, the values of $\alpha$ ranges between 0 and 1. Of course, the graphs shown with reference to FIG. 5 are ideal cases, and are not representative of the actual function of the preferred embodiment. This is because very small values of $\alpha$ cause unacceptably long decay times on a display such as 130. Colors from a previous time period remain to be displayed upon the screen for very long periods of time. For example, in a worst case, colors may persist on the display even long after a probe is no longer receiving reflected Doppler signal data in the examples shown in FIG. 5. Because of these undesirable effects, the preferred embodiment uses a series of function curves as is shown in FIG. 6.

Figure 6:
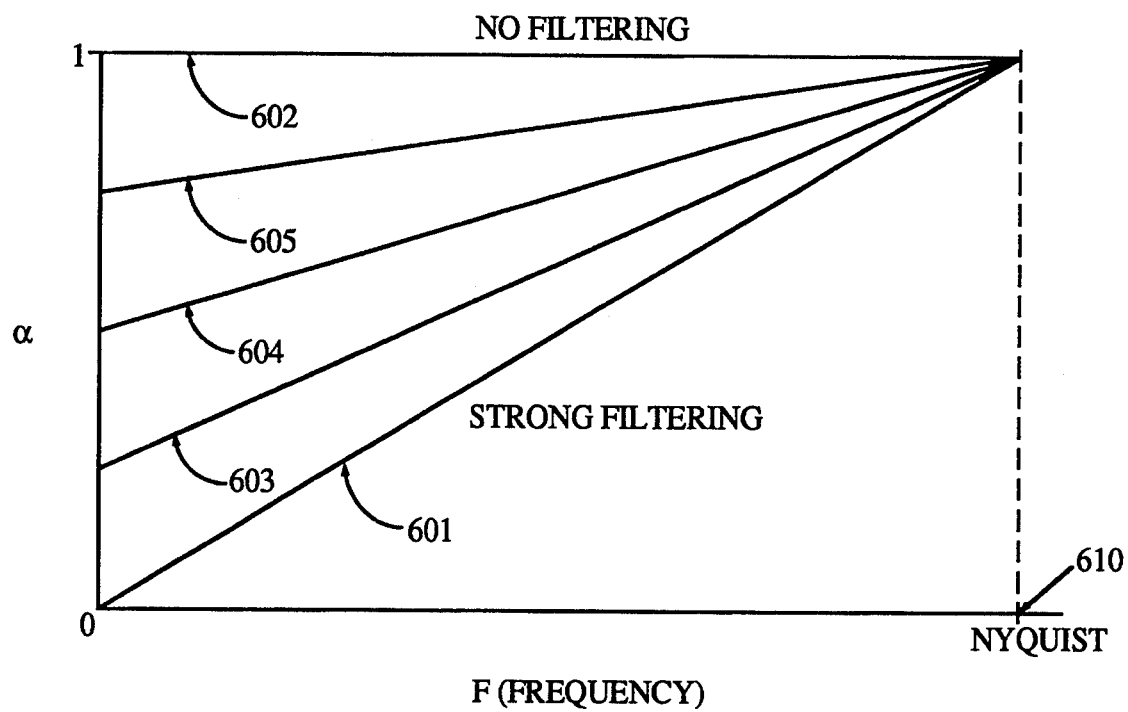
FIG. 6 shows various curves which may be used for generating different values of $\alpha$ depending on frequency for different settings of temporal filtering.

The various curves shown in FIG. 6 provide different filtering settings for different ranges of $\alpha$ according to the operator's requirements. For instance, the curve 601 will be used when the maximum amount of filtering is required, and curve 602 is used when no filtering at all is required. Intermediate levels of filtering may be performed when the operator selects one of the other intermediate filtering setting curves 603, 604, or 605 using a control panel. Note that each of the curves converges at Nyquist 610. Therefore, no temporal filtering is performed at all when the frequency of the reflected waves reaches Nyquist 610.

Figure 2:
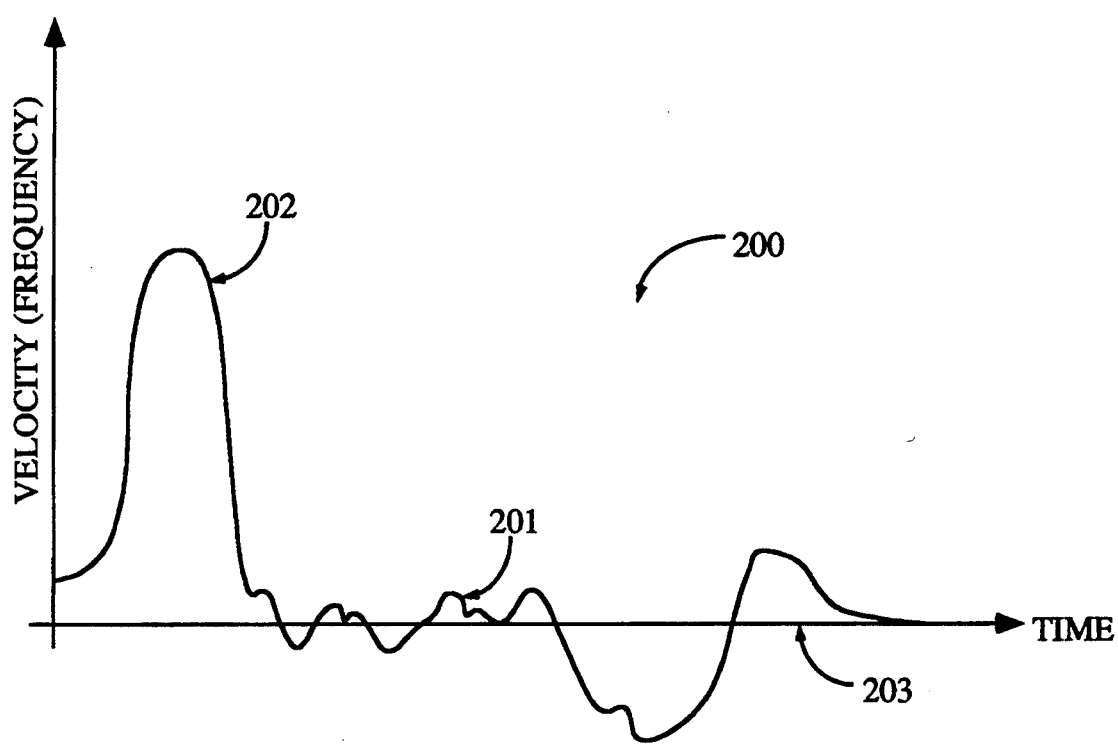
FIG. 2 shows a typical prior art wave form of a particular region in a living subject.
Figure 7:
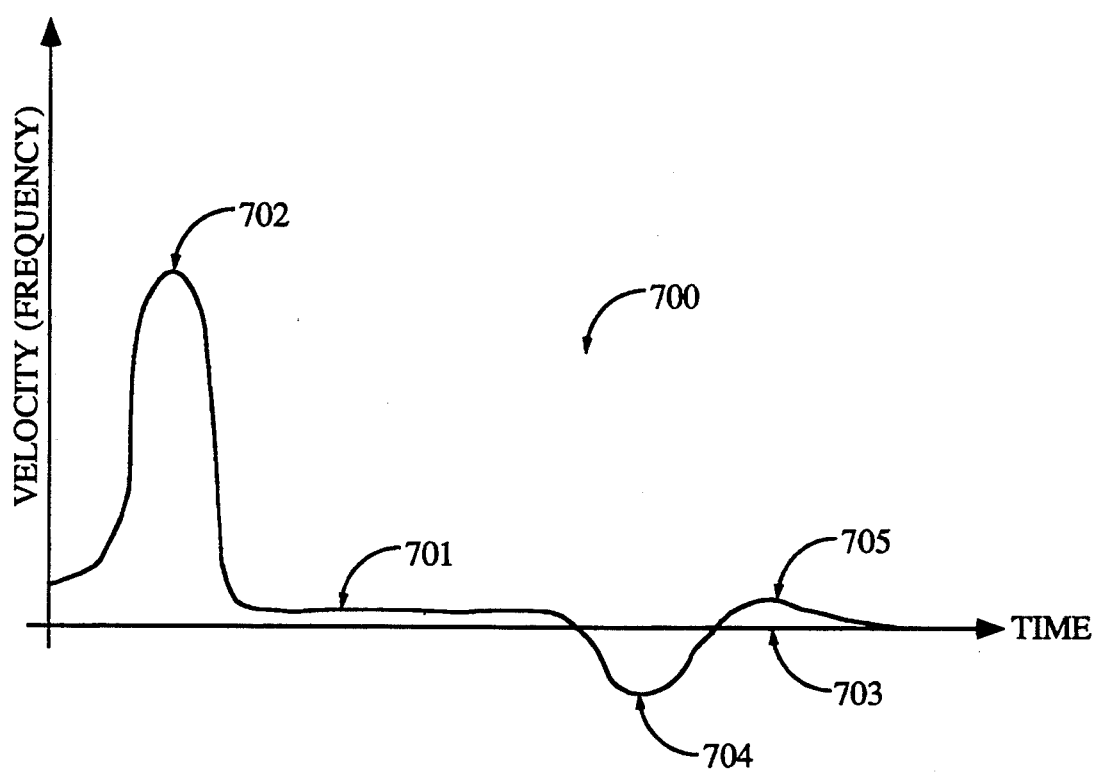
FIG. 7 shows a resulting waveform from applying a temporal filter which uses a frequency dependent variable $\alpha$ to perform temporal filtering.

By using graphs such as those shown in FIGS. 5 and 6 as discussed above, to vary the value of $\alpha$ depending on frequency of the reflected signals, a better representation of the reflected data may be approximated at the higher frequency levels, while those near the base line may be filtered. For instance, as shown in 700 of FIG. 7, the same data that was unfiltered as shown in FIG. 2 may be applied and filtered by an apparatus using a variable $\alpha$ value. For instance, the portion of the signal near base line 703 in area 701 may represent an average of the region 201 shown in FIG. 2. Pulsatile portions of the signal such as 202 shown in FIG. 2 are preserved as is shown by region 702. Yet other pulsatile portions such as 704 and 705 are also better approximated because their frequency is greater than baseline 703. Thus, the variable alpha provided by the preferred embodiment is a distinct improvement over the prior art method of using a single value of $\alpha$ for temporal filtering of ultrasonic signal data.

Figure 8:
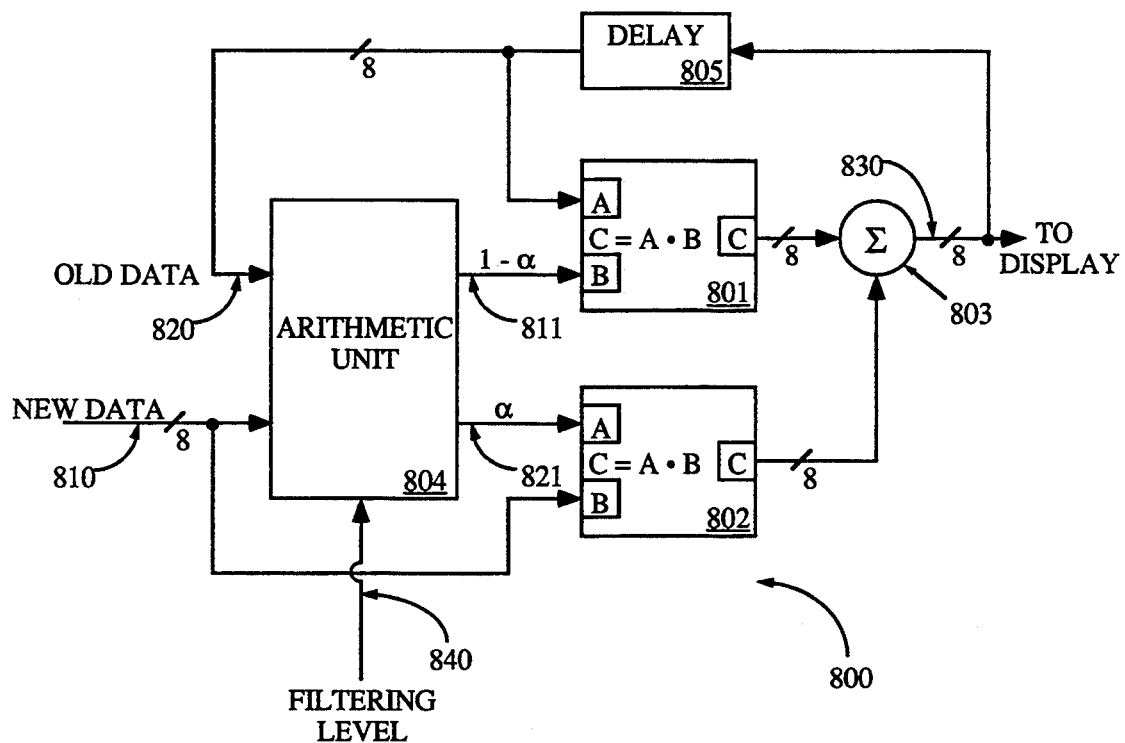
FIG. 8 shows one apparatus which may use the old and new signal data to generate variable $\alpha$ values for temporal filtering.

In one embodiment of the invention, the apparatus shown as 800 in FIG. 8 may be used. 800 has the two signal paths 810 and 820 for the new signal data and the old signal data, respectively. These are input to an arithmetic unit 804 which calculates the variable $\alpha$ depending on the larger of the two values contained on lines 810 and 820. Arithmetic unit 804 calculates $\alpha$ using functions similar to those shown in the graph in FIG. 6, providing large values of $\alpha$ when the larger of the two frequencies input on 810 and 820 approaches Nyquist 610 or some other maximum value, and providing small values of $\alpha$ when the larger of the two frequencies input on lines 810 and 820 approaches zero or some other minimum value. In this way, small frequencies or velocities are filtered very heavily and large frequencies are almost not filtered at all. The larger of the two frequencies (old and new over lines 820 and 810, respectively) is selected in order to allow for large transitions between color frames, which is filtered very little in order to maintain the pulsatility of the data. Two consecutive small magnitudes of frequency shifts are filtered very heavily, and one large magnitude of frequency shift (and its adjacent frame containing either large or small magnitude information) is filtered very little. Arithmetic unit 804 also accepts a filtering level over lines 840, wherein one of the five filtering levels as shown by graphs 601 through 605 in FIG. 6 is selected. Because there are five filtering levels in the preferred embodiment, lines 840 will comprise three bits of information. In other embodiments, more filtering settings may be provided. Arithmetic unit 804 provides $\alpha$ over line 821, and provides the maximum magnitude of $\alpha$ (in this case, the value one) minus $\alpha$ in order to provide the proper coefficient for the old data. The $\alpha$ and $1-\alpha$ values input over lines 811 and 821 are fed into multipliers 801 and 802 to provide the necessary product based upon the filtering coefficients of the old and new data information. Multipliers 801 and 802 feed into adder 803 and the resulting 8-bit display value is output over lines 830 for display. As described with reference to the prior art system in FIG. 3, display information 803 is fed back through a delay circuit 805 in order to provide the displayed information as old data for the next frame. Each pixel in the display is filtered using an apparatus such as 800 in this embodiment so that an entire display may be generated. Note also that delay circuit 805 generally delays the data by one frame, however, the delay may be implementation-dependent according to a user's needs. In some embodiments, the frame rate is approximately 15 frames per second but this again is implementation-dependent.

Figure 1:
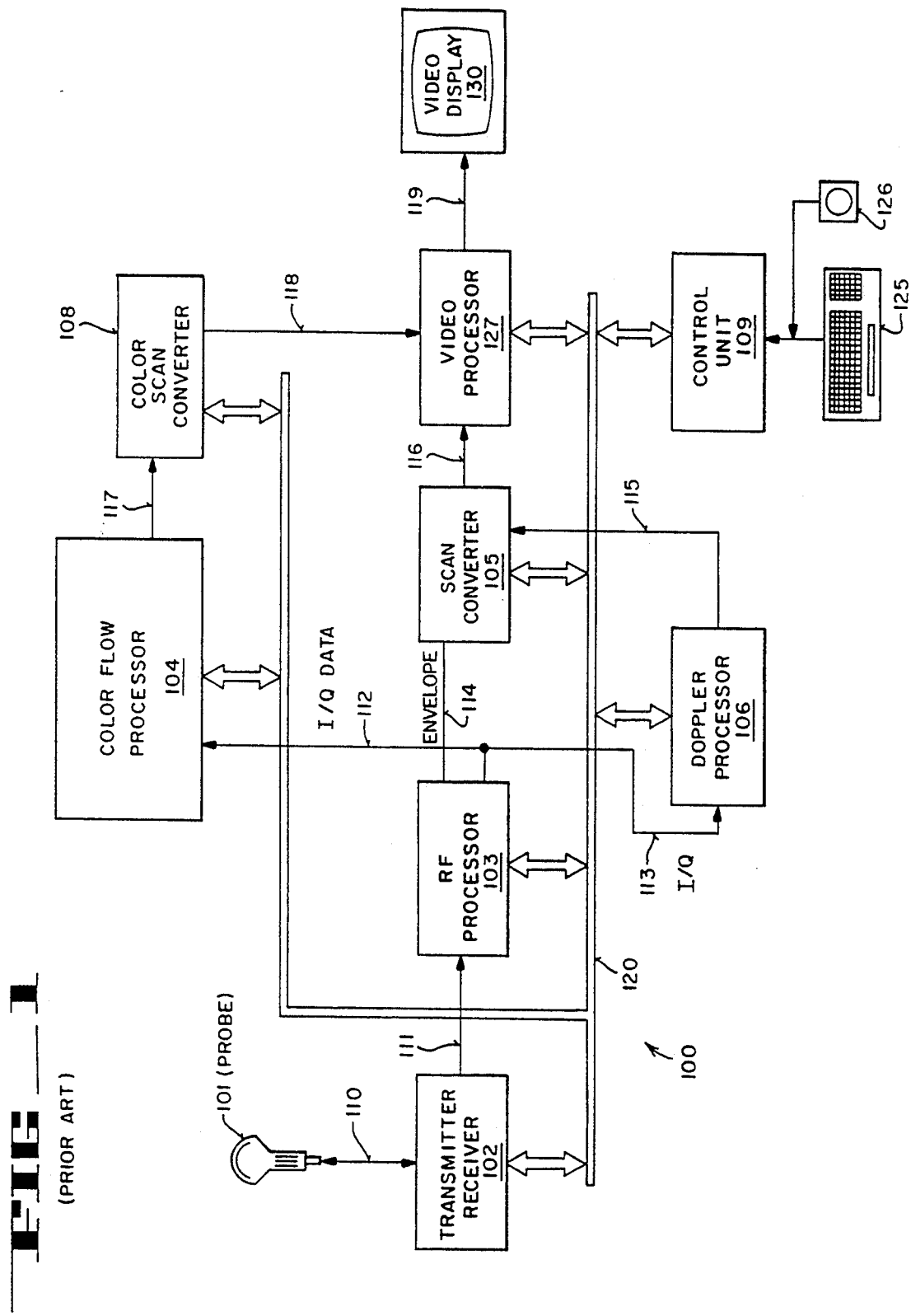
FIG. 1 shows a block diagram of a typical ultrasonic imaging system.
Figure 9:
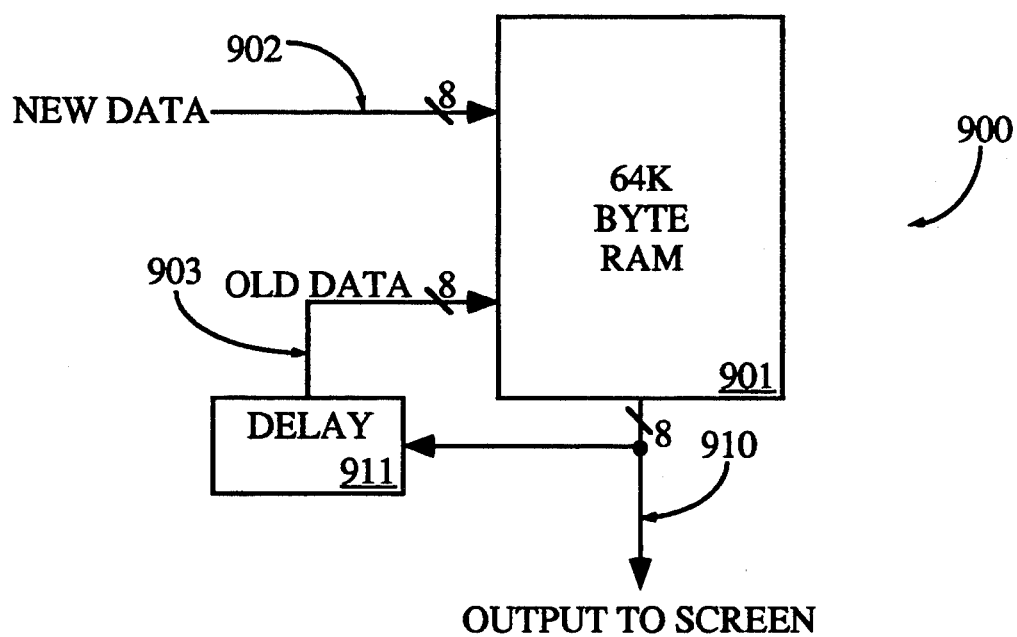
FIG. 9 shows one embodiment of the present invention which utilizes a lookup table into which old and new data may be applied to generate a resulting temporal filter data.

Instead of using components such as adders and multipliers as was shown in FIG. 8 above, the preferred embodiment uses a lookup table loaded with all the possible 8-bit color values which may be input to a circuit such as 800 for one filtering level. This is graphically represented as shown in FIG. 9. As shown in FIG. 9, 900 uses a lookup table 901 which is a 64-kilobyte random access memory which has been loaded with all the possible filtered output values which may be displayed upon a screen such as 130 shown in FIG. 1. Depending on the filtering setting, RAM 901 is loaded with different values from disk storage, but it may be appreciated by one skilled in the art that RAM 901 may be loaded from a programmable read-only memory or similar non-volatile medium. Table 901 is addressed by two sets of lines 902 and 903 which contain the new ultrasonic imaging data and the old ultrasonic imaging data, respectively. The two 8-bit values over lines 902 and 903 are combined to form an address to reference one of the 65,536 possible locations in table 901. Output from table 901 is generated onto lines 910 which is output to display screen 130 shown in FIG. 1. The output is also fed back into delay circuit 911. Delay circuit 911 delays the 8-bit value received on lines 910 from table 901 by one time period (equal to one color frame period). Therefore, data generated on line 910 is delayed by one frame, and 903 and 902 are synchronized to address table 901 simultaneously.

Figure 3:
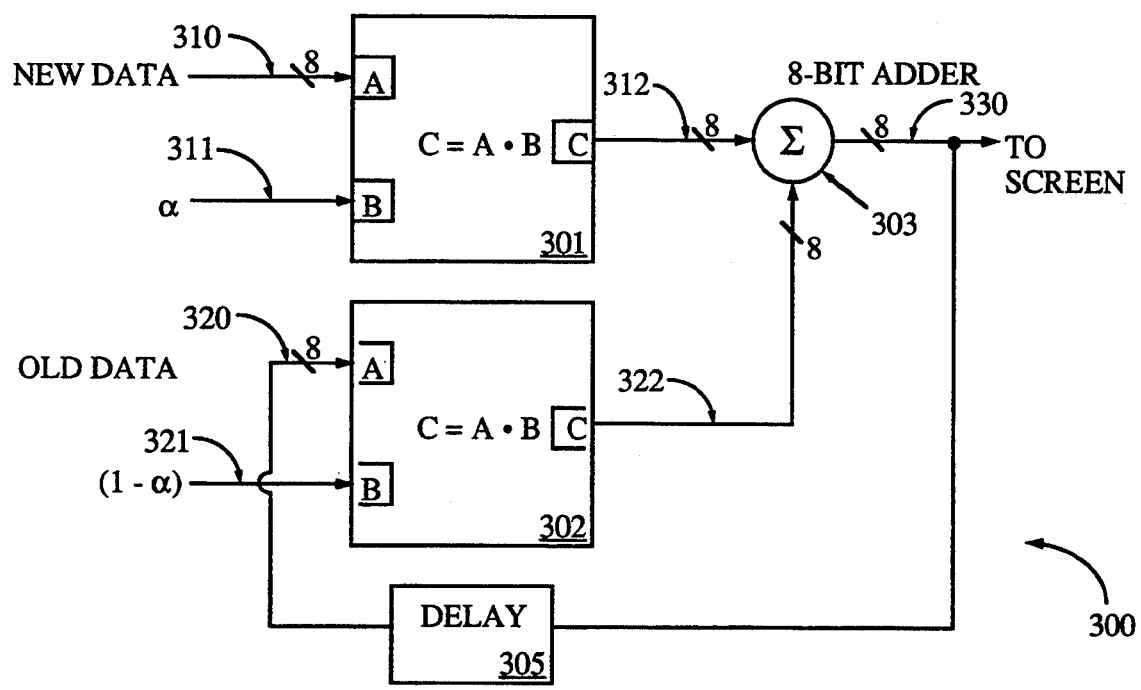
FIG. 3 shows a prior art temporal filter used for eliminating noise in regions where there is stationary or slow moving blood flow in a living subject.

Table 901 is loaded with values at the time the operator selects a new filtering mode. These values are pre-computed off-line, and stored in disk-based storage in a system such as 100 shown in FIG. 1 such that table 901 may be loaded and ready for operation in a short period of time. When the operator selects a new filtering mode, the pre-computed table values may be retrieved find placed into table 901 so that it is ready for operation. In this way, and by the use of a lookup table such as 901 shown in FIG. 9, the use of complicated hardware such as multipliers and adders as is shown in FIG. 3 above is eliminated. Also, the delay caused by circuits such as address, multipliers, and other arithmetic units is eliminated.

Of course, it can be appreciated by one skilled in the art that other types of memories may be used than 900 for implementing the present invention. For instance, an additional bit or bits may be applied to the table to indicate various areas in the memory to be accessed, and thus all the filter settings may reside in the lookup table memory. Instead of dynamic memories, read only memory (ROM) may be used for retrieving the new color values output to a display such as 130. It can be appreciated by one skilled in the art that many departures and modifications may be made within the spirit and scope of the present invention.

Thus an invention for performing temporal filtering upon ultrasonic imaging data has been described. Although the present invention has been described specifically with reference to FIGS. 1 through 9, it can be appreciated by one skilled in the art that this invention has application far exceeding that disclosed in the figures. It would be obvious to one skilled in the art that many departures and modifications may be made from the embodiment as disclosed herein.

What is claimed is:

1. An apparatus for temporal filtering of color doppler imaging information representing velocity in an ultrasonic color doppler imaging system comprising:

a. a means for storing previous color imaging information said color representing a first frequency which represents a first velocity of flow of a substance in a subject under examination at a first position from a previous time period;

b. a means for storing current color imaging information said color representing a second frequency which represents a second velocity of flow of the substance in said subject under examination at said first position from a current time period;

c. a means for determining the larger of either said first or said second frequency;

d. a means for generating an alpha value responsive to the means for determining the larger of either said first or said second frequency, the alpha value being in a range at or between a minimum and maximum values and having the maximum value when the larger of either the first or second frequency is greater than or equal to a maximum frequency and having the minimum value when the larger of either the first or second frequency is less than or equal to a minimum frequency; and e. a means for generating output color imaging information including:

i. a first multiplying means for generating a first product of said alpha value and said current color imaging information;

ii. a second multiplying means for generating a second product of said maximum value minus said alpha value and said previous color imaging information; and iii. a summing means for summing said first product and said second product to generate said output color imaging information.

2. The apparatus of claim 1 wherein a combination of the means for determining the larger of either said first or said second frequency, the means for generating an alpha value and the means for generating output color imaging information comprises a lookup table.

3. The apparatus of claim 2 wherein the lookup table resides in a volatile memory.

4. The apparatus of claim 2 wherein the lookup table resides in a non-volatile memory.

5. The apparatus of claim 1 wherein the minimum value is zero and the maximum value is one.

6. The apparatus of claim 1 further comprising a delay means which receives and delays the output imaging information to generate the previous imaging information for a subsequent time period.

7. A method of temporal filtering of color doppler imaging information representing velocity in an ultrasonic color doppler imaging system comprising:

a. storing previous color imaging information said color representing a first frequency which represents a first velocity of flow of a substance in a subject under examination at a first position from a previous time period;

b. storing current color imaging information from a current time period said color representing a second frequency which represents a second velocity of flow of the substance in said subject under examination at said first position;

c. determining the larger of either said first or said second frequency;

d. generating an alpha value, the alpha value being in a range at or between a minimum and maximum values and having the maximum value when the larger of either the first or second frequency is greater than or equal to a maximum frequency and having the minimum value when the larger of either the first or second frequency is less than or equal to a minimum frequency; and e. generating output color imaging information by multiplying the current color imaging information by alpha and summing it with the product of the maximum value minus alpha and the previous color imaging information.

8. The apparatus of claim 7 wherein the minimum value is zero and the maximum value is one.

9. A method of temporal filtering of color doppler imaging signals in an ultrasonic color doppler imaging system to generate an output color imaging signal, said color doppler imaging signals representing frequency shifts from reference pulses in said system due to motion of a substance in a subject under examination, comprising:

a. storing a previous color doppler imaging signal, said signal representing a firs frequency which represents a first velocity of flow of the substance in a subject under examination at a first position from a previous time period;

b. receiving a current color doppler imaging signal from a current time period said signal representing a second frequency which represents a second velocity of flow of the substance in said subject under examination at said first position;

c. determining the larger of either said first or said second frequency;

d. generating an alpha value, said alpha value being in a range at or between a minimum and maximum values and having said maximum value when said larger of either said first or second frequency is greater than or equal to a maximum frequency and having said minimum value when said larger of either said first or second frequency is less than or equal to a minimum frequency; and e. generating an output imaging signal by multiplying said current color imaging signal by alpha and summing it with a product of said maximum value minus alpha and said previous color imaging signal.

10. An apparatus for temporal filtering of a color doppler imaging signal representing velocity in a color doppler imaging system comprising:

a. a memory for storing a previous color imaging signal, said signal representing a first frequency which represents a first velocity of flow of a substance in a subject under examination at a first position from a previous time period;

b. a receiver for receiving a current color imaging signal said signal representing a second frequency which represents a second velocity of flow of the substance in said subject under examination at said first position from a current time period;

c. a comparator for determining the larger of either said first or said second frequency;

d. an alpha value generator, said alpha value being in a range at or between a minimum and maximum values and having said maximum value when said larger of either said first or second frequency is greater than or equal to a maximum frequency and having said minimum value when said larger of either said first or second frequency is less than or equal to a minimum frequency; and e. a first multiplier for generating a first product of said alpha value and said current color imaging signal;

f. a subtractor for generating a first coefficient by subtracting said alpha value form said maximum value;

g. a second multiplier for generating a second product of said first coefficient and said previous color imaging signal; and h. an adder for summing said first product and said second product to generate an output color imaging signal.

11. An apparatus for temporal filtering of a color doppler imaging signal representing velocity in a color doppler imaging system comprising:

a. a memory for storing previous color imaging signal, said color representing a first frequency which represents a first velocity of flow of a substance in a subject under examination at a first position from a previous time period;

b. a receiver for receiving a current color imaging signal said color representing a second frequency which represents a second velocity of flow of the substance in said subject under examination at said first position from a current time period.

c. determining the larger of either said first or said second frequency;

d. generating an alpha value, the alpha value being in a range at or between a minimum and maximum values and having the maximum value when the larger of either the first or second frequency is greater than or equal to a maximum frequency and having the minimum value when the larger of either the first or second frequency is less than or equal to a minimum frequency;

e. a lookup table coupled to said memory and said receiver for providing a temporally filtered color doppler imaging signal responsive to receiving said previous color imaging signal and said current color imaging signal, said lookup table containing a plurality of pre-computed entries referenced by said previous color imaging signal and said current color imaging signal, each of said entries comprising a pre-computed temporally filtered color imaging signal generated by sequencing through all possible values of said previous color imaging signal and said current color imaging signal in the following manner:

i. generating a first product of said alpha value and said possible value for said current color imaging signal;

ii. generating a first coefficient by subtracting said alpha value from said maximum value;

iii. generating a second product of said first coefficient and said possible value for said previous color imaging signal; and iv. summing said first product and said second product to generate said pre-computed temporally filtered color imaging signal.

12. An apparatus for temporal filtering of a color doppler imaging signal representing velocity in a color doppler imaging system comprising:

a. a delay means for delaying a previous color imaging signal to provide said previous color imaging signal in a current time period, said signal representing a first frequency which represents a first velocity of flow of a substance in a subject under examination at a first position from a previous time period;

b. a receiver for receiving a current color imaging signal said signal representing a second frequency which represents a second velocity of flow of the substance in said subject under examination at said first position from said current time period;

c. a comparator for determining the larger of either said first or said second frequency;

d. an alpha value generator, said alpha value being in a range at or between a minimum and maximum values and having said maximum value when said larger of either said first or second frequency is greater than or equal to a maximum frequency and having said minimum value when said larger of either said first or second frequency is less than or equal to a minimum frequency; and e. a first multiplier for generating a first product of said alpha value and said current color imaging signal;

f. a subtractor for generating a first coefficient by subtracting said alpha value from said maximum value;

g. a second multiplier for generating a second product of said first coefficient and said previous color imaging signal; and h. an adder for summing said first product and said second product to generate an output color imaging signal.

13. An apparatus for temporal filtering of a color doppler imaging signal representing velocity in a color doppler imaging system comprising:

a. a delay means for delaying a previous color imaging signal to provide said previous color imaging signal in a current time period, said signal representing a first frequency which represents a first velocity of flow of a substance in a subject under examination at a first position from a previous time period;

b. a receiver for receiving current color imaging signal said color representing a second frequency which represents a second velocity of flow of the substance in said subject under examination at said first position from said current time period;

c. determining the larger of either said first or said second frequency;

d. generating an alpha value, the alpha value being in a range at or between a minimum and maximum values and having the maximum value when the larger of either the first or second frequency is greater than or equal to a maximum frequency and having the minimum value when the larger of either the first or second frequency is less than or equal to a minimum frequency;

e. a lookup table coupled to said memory and said receiver for providing a temporally filtered color doppler imaging signal responsive to receiving said previous color imaging signal and said current color imaging signal, said lookup table containing a plurality of pre-computed entries referenced by said previous color imaging signal and said current color imaging signal, each of said entries comprising a pre-computed temporally filtered color imaging signal generated by sequencing through all possible values of said previous color imaging signal and said current color imaging signal in the following manner:

i. generating a first product of said alpha value and said possible value for said current color imaging signal;

ii. generating a first coefficient by subtracting said alpha value from said maximum value;

iii. generating a second product of said first coefficient and said possible value for said previous color imaging signal; and iv. summing said first product and said second product to generate said pre-computed temporally filtered color imaging signal.

* * * * *